Sept. 26, 1967      M. B. KIRKPATRICK      3,343,878
ROTARY TUNNELING MACHINE HAVING RESILIENTLY
MOUNTED VIBRATED KERF CUTTER
Original Filed Aug. 3, 1962      11 Sheets-Sheet 1

INVENTOR
Max B. Kirkpatrick

BY Strauch, Nolan, Neale,
Nies & Bronaugh
ATTORNEYS

Sept. 26, 1967  M. B. KIRKPATRICK  3,343,878
ROTARY TUNNELING MACHINE HAVING RESILIENTLY
MOUNTED VIBRATED KERF CUTTER
Original Filed Aug. 3, 1962  11 Sheets-Sheet 2

INVENTOR
*Max B. Kirkpatrick*

BY *Strauch, Nolan, Neale,
Nies & Bronaugh*
ATTORNEYS

INVENTOR
*Max B. Kirkpatrick*

Strauch, Nolan, Neale,
Nies & Bronaugh
ATTORNEYS

United States Patent Office 3,343,878
Patented Sept. 26, 1967

3,343,878
ROTARY TUNNELING MACHINE HAVING RESIL-
IENTLY MOUNTED VIBRATED KERF CUTTER
Max B. Kirkpatrick, Wickenburg, Ariz., assignor to Alkirk,
Inc., Seattle, Wash., a corporation of Delaware
Original application Aug. 3, 1962, Ser. No. 214,751.
Divided and this application June 29, 1966, Ser. No.
561,542
2 Claims. (Cl. 299—31)

This is a division of Ser. No. 214,751, filed Aug. 3, 1962 for Earth Boring Machine, and now abandoned.

This invention relates to earth boring machines, such as mining and tunnel cutting machines, and particularly to such machines wherein a flexibly mounted cutter is subjected to periodic impact forces during cutting.

In this preferred embodiment the machine will be described as incorporated in a machine having at least one main cutter and an associated pilot cutter that first quickly cuts a small diameter pilot bore into the face of the material and then anchors itself in the pilot bore. The rotating main cutter is then advanced into the face of the material by a force reacting from the pilot anchor in the material.

It is a major object of the invention to provide a novel earth boring machine wherein a cutting member being advanced into material to be cut is subjected to periodic vibration substantially in the direction of cutting.

It is a further object of the invention to provide in a mining, tunnel cutting or like machine a novel cutter structure and mode of operation wherein a toothed or bladed cutting device is periodically vibrated as it is being pulled into the material to be cut whereby periodic high impact pressures are superposed on the constant feeding pressure pulling the cutter into the material.

Another object of the invention is to provide in a mining, tunnel cutting or like machine a toothed or bladed cutting device that is supported by resilient means, such as a rubber bushing arrangement, on a machine frame, and a periodically actuated vibrator is mounted on said device.

Further objects of the invention will appear as the description proceeds in connection with the annexed claims and the appended drawings wherein:

Figure 1:
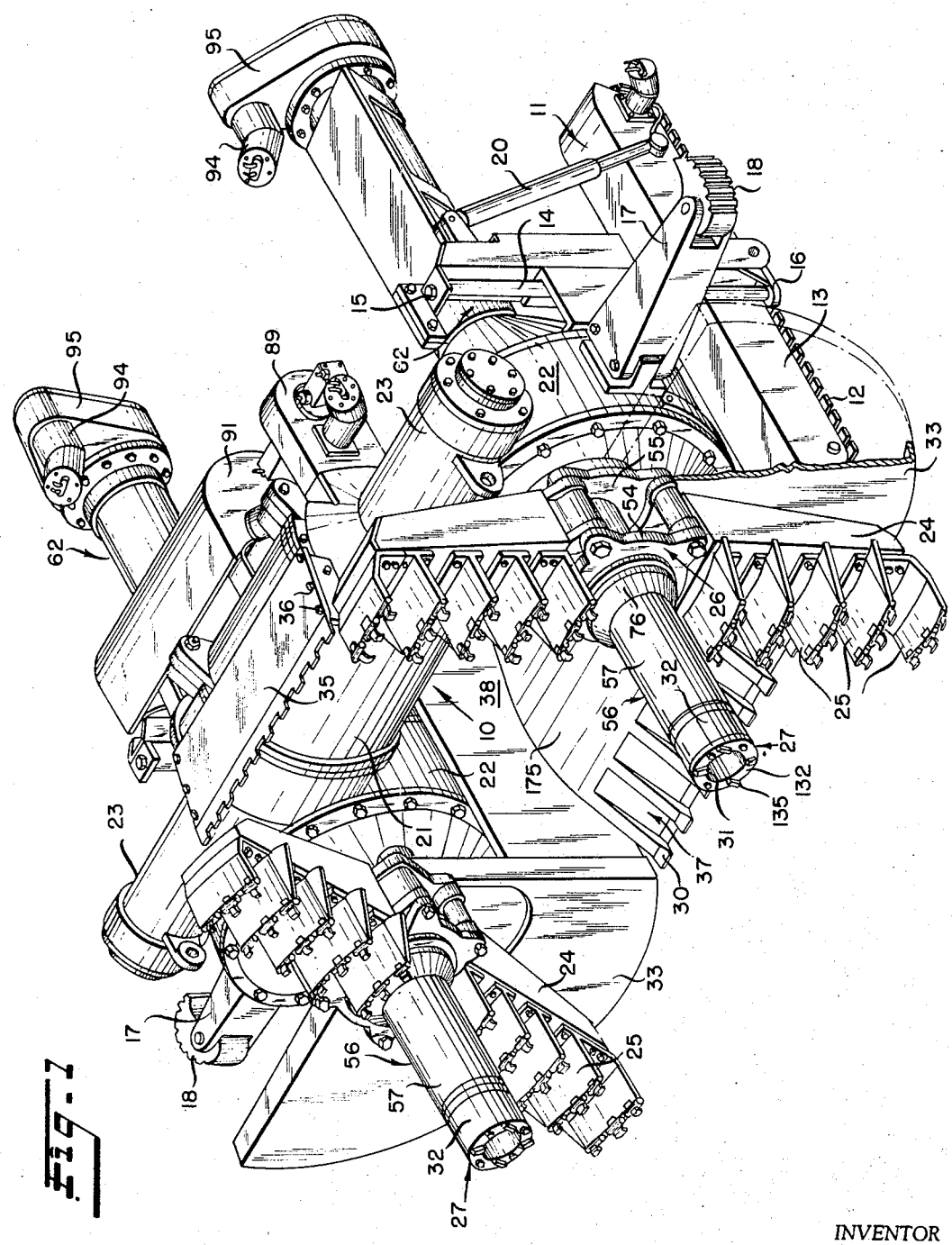
FIGURE 1 is a generally perspective front view of the mining machine comprising a preferred embodiment of the invention, showing main and pilot cutters, the lower vibrated cusp cutter, and overall structure.

The illustrated mining machine comprises a rigid body structure 10 of generally inverted U-shaped which is supported on and movable along the floor of the tunnel being cut by generally parallel endless track units 11. Only one track unit 11 is shown in FIGURE 1 but there are preferably two of them, longitudinally disposed one under each main cutter. Each unit 11 comprises an endless traction belt 12 carried by driven wheels mounted on a skeleton structure (not shown) enclosed at its upper end by a cover 13.

Each entire track unit 11 may be lifted with respect to the floor of the tunnel by an elevator jack shown at 14 which has its upper end fixed at 15 to the body 10 and its lower end secured at 16 to track unit 11. There is one of these elevator jacks at each side, between each track unit and the body, and they may be used to select the vertical height of the cutter assemblies. Fitting jacks 20 consisting of telescoped rods pivotally connected to the machine body and each track unit 11 select the direction of the cutting axis.

At each side of body 10, a sprag arm 17 extends from the body to terminate in pivoted eccentric toothed sprags 18 that engage the opposite tunnel side walls of anchor the body as at least when the initial pilot bores are being formed.

Referring to FIGURE 1, the U-shaped body 10 has a central upper bridge 21 serving as a hollow motor and drive mechanism housing. Bridge 21 extends transversely and terminates at opposite ends in enlarged hollow drive gear housings 22 which have their axes longitudinally of the machine and parallel to each other and are disposed below the reduced end sections 23 of housing 21. Housings 21 and 22 are rigid with each other, being composed of suitable sections bolted together or integral as desired.

Centered with the respective housings 22 are the main cutter arms 24 having hubs 26 by which they are mounted for rotation about parallel axes extending longitudinally of the machine. Arms 24 are equipped on their front ends with suitable coal, rock or like cutter bits 25.

Extending centrally through the hollow hub section of each main cutter arm 24 is a small diameter pilot cutter unit 27 mounted for longitudinal sliding movement on its axis so that it may be extended considerably forwardly from the associated main cutter arm.

As will appear the two main cutter arms 24 which are essentially identical are rotated in opposite directions, preferably the left cutter arm in FIGURE 1 being rotated counterclockwise as shown by the arrow and the right cutter arm in FIGURE 1 being rotated clockwise as shown by its arrow. This will aid stability by providing counteracting drive torque reactions to the machine frame and it moves the cut material toward the center of the tunnel for ease of removal through the body.

Drilling heads 27, which are pilot bore forming devices, are rotatable independently of the main cutter arms and are formed with cutting teeth 31. Just rearwardly of teeth 31 is a cylindrical rubber sleeve assembly 32. In operation of the machine each pilot cutter 27 may be extended forwardly to drill a relatively small bore while this sleeve assembly 32 is relaxed as in FIGURE 7, and then sleeve assembly 32 is expanded radially to tightly grip the wall of the formed small pilot bore. This anchors the pilot assembly in the earth ahead of the tunnel being cut and enables the rotating main cutters 24 to be essentially pulled into cutting engagement with the end face of the tunnel and gradually advanced to form the tunnel. For hard rock tunnelling particularly it may be desirable to rotate both the main and pilot cutters simultaneously after the initial pilot bore has been formed to provide essentially continuous operation of the machine. Details of structure and operation will now appear.

Rearwardly of each main cutter arm 24 a large shield or guard 33 is provided rigid with the body 10. This guard is generally of quadrant shape and disposed forwardly of the track units 11, and it is partially broken away at the right side of FIGURE 1 to show the track unit.

Above the bridge housing 21 a generally horizontal toothed cusp cutter blade 35 is secured to the body 10 as by bolts 36. This removes the triangular cusp left on the roof by the rotating main cutters which cut intersecting essentially cylindrical bores as they rotate.

The transverse distance between the centers of rotation of arms 24 is less than the diametral length of an arm 24, so that these arms may rotate in relatively overlapping synchronism and leave only relatively small triangular uncut cusps projecting from the floor and the roof of the tunnel.

At the bottom of the body below bridge 21 another horizontal toothed cusp cutter 37 is mounted. Preferably cutter 37 is resiliently supported in rubber on body 10 and is periodically vibrated by a high cycle electrical impactor device as will appear from FIGURES 8 and 9. This vibration aids the cutting action.

Preferably lower cutter 37 has a toothed forward blade structure 30, and extends rearwardly to provide a chute 38 that extends to the rear of the machine. Material cut by the main cutter arms 24 and by the upper and lower cusp cutters 35 and 37 passes through this chute to suitable take-away conveyors at the rear of the machine.

Figure 2:
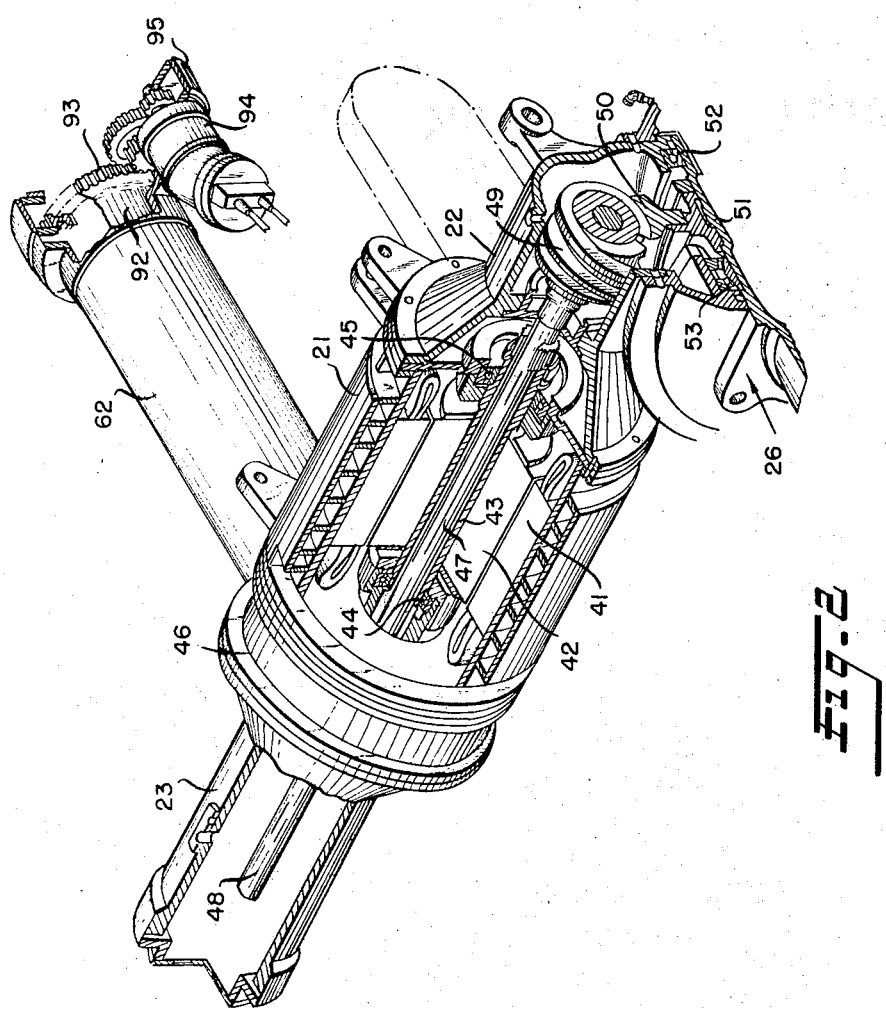
FIGURE 2 is a fragmentary perspective view, partly broken away and sectioned, showing the electric motor drive to the main cutters and the hydraulic motor drive to each pilot cutter.
Figure 4:
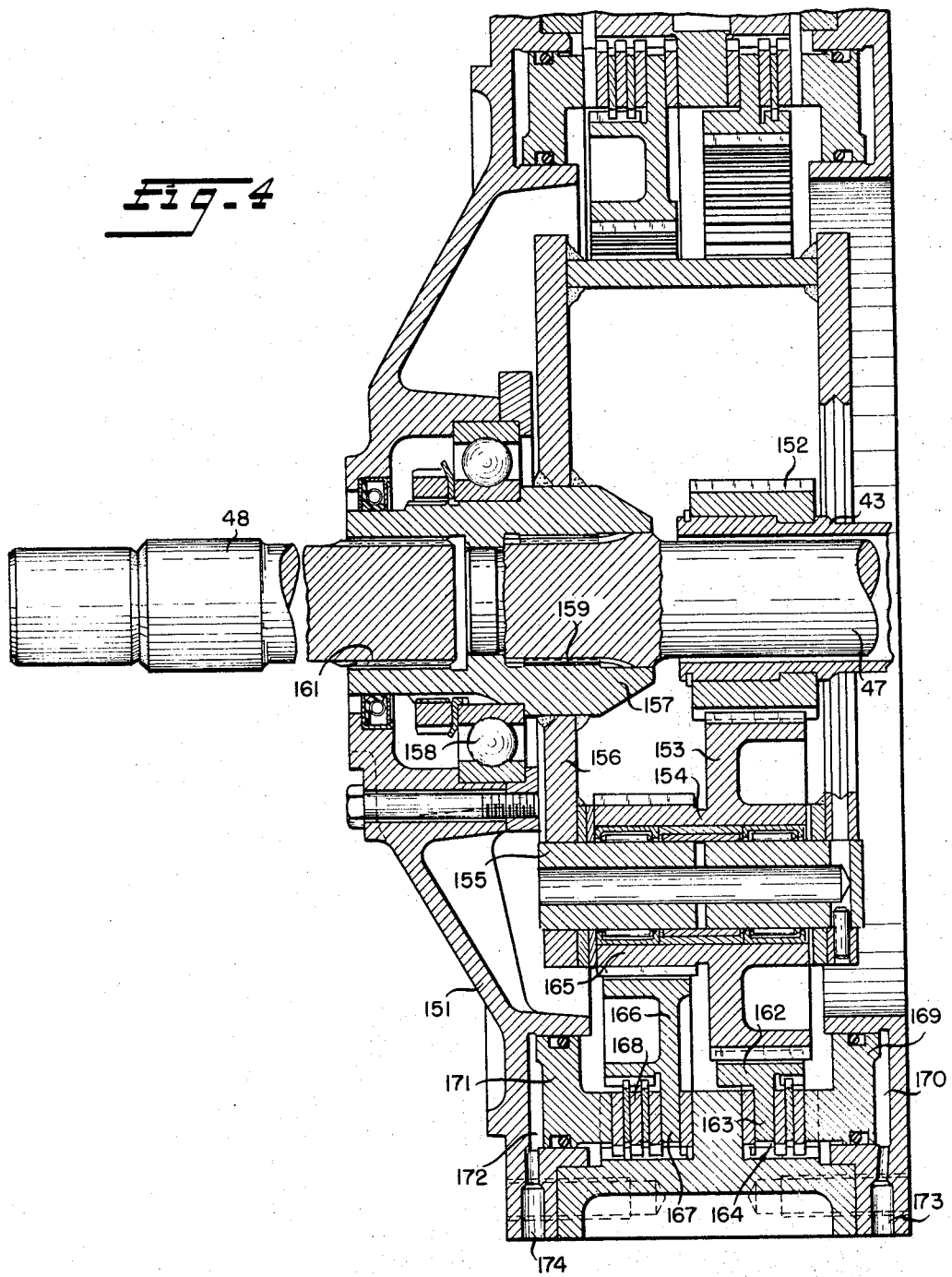
FIGURE 4 is a fragmentary section showing the planetary gearing for the motor drive to the main cutters.

Referring now to FIGURE 2, the housing 21 about the electric motor encloses the ventilated motor stator 41 surrounding the driven rotor 42 which is secured on a hollow shaft 43 supported in bearings 44 and 45. At its left end in FIGURE 2, shaft 43 is connected into a two speed planetary transmission 46 having coaxial output shafts 47 and 48, as shown in FIGURE 4.

Shaft 47 (FIGURES 2 and 3) extends through hollow shaft 43 and terminates within gear housing 22 in a worm 49 meshed with a worm gear 50 rigidly mounted on a hub structure 51 for one main cutter arm 24. This annular hub structure 51 is journaled on spaced bearings 52 and 53 in the drive gear housing, and is formed outside the front of the drive gear housing 22 with hub section 26 carrying cutter arm fitting support flanges 54 and 55. The main cutter arms 24 are rigidly bolted to these flanges.

A reciprocable non-rotatable hollow piston rod 56 extends coaxially through hub 51 and projects forwardly at 57 out of the hub structure of each main cutter. This piston rod is shown along its entire length in FIGURE 3, and along enlarged sections of its length in FIGURES 5 and 6.

Figure 3:
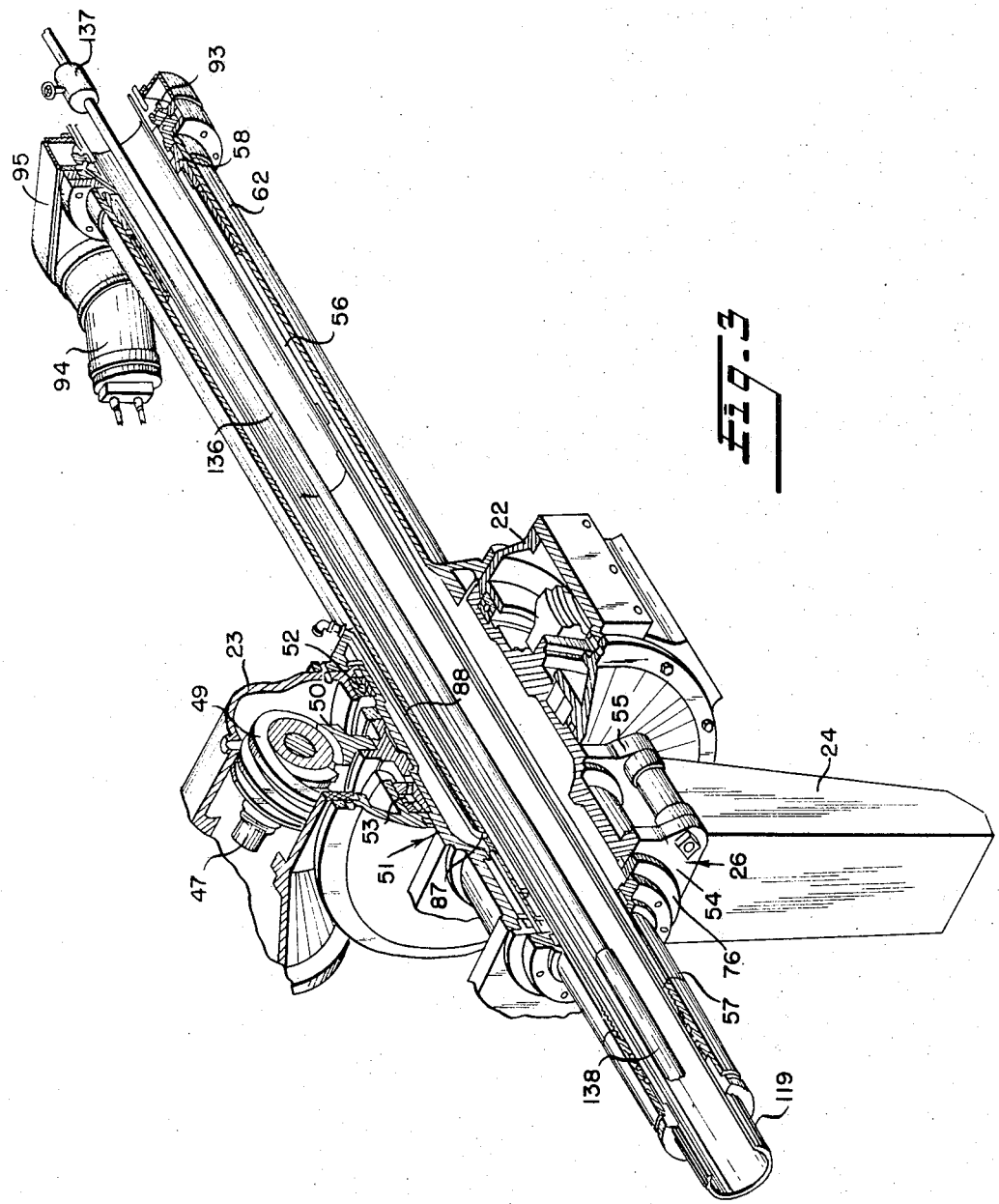
FIGURE 3 is a fragmentary perspective view, partially broken away and sectioned, showing the pilot cutter and anchor structures as well as the main cutter drive gearing.
Figure 5:
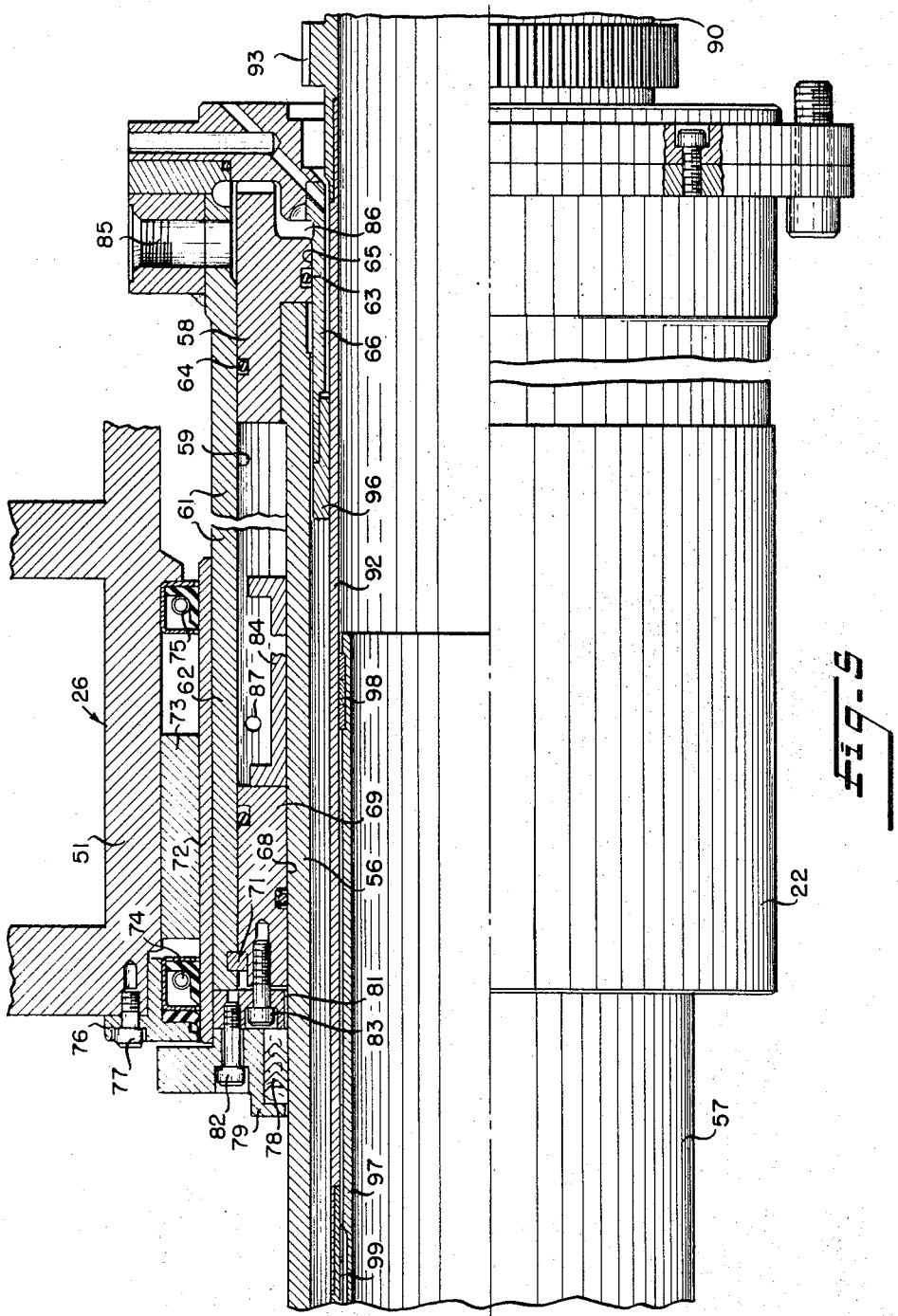
FIGURE 5 is an enlarged fragmentary side elevation partially broken away and in section showing particularly part of the pilot assembly.
Figure 6:
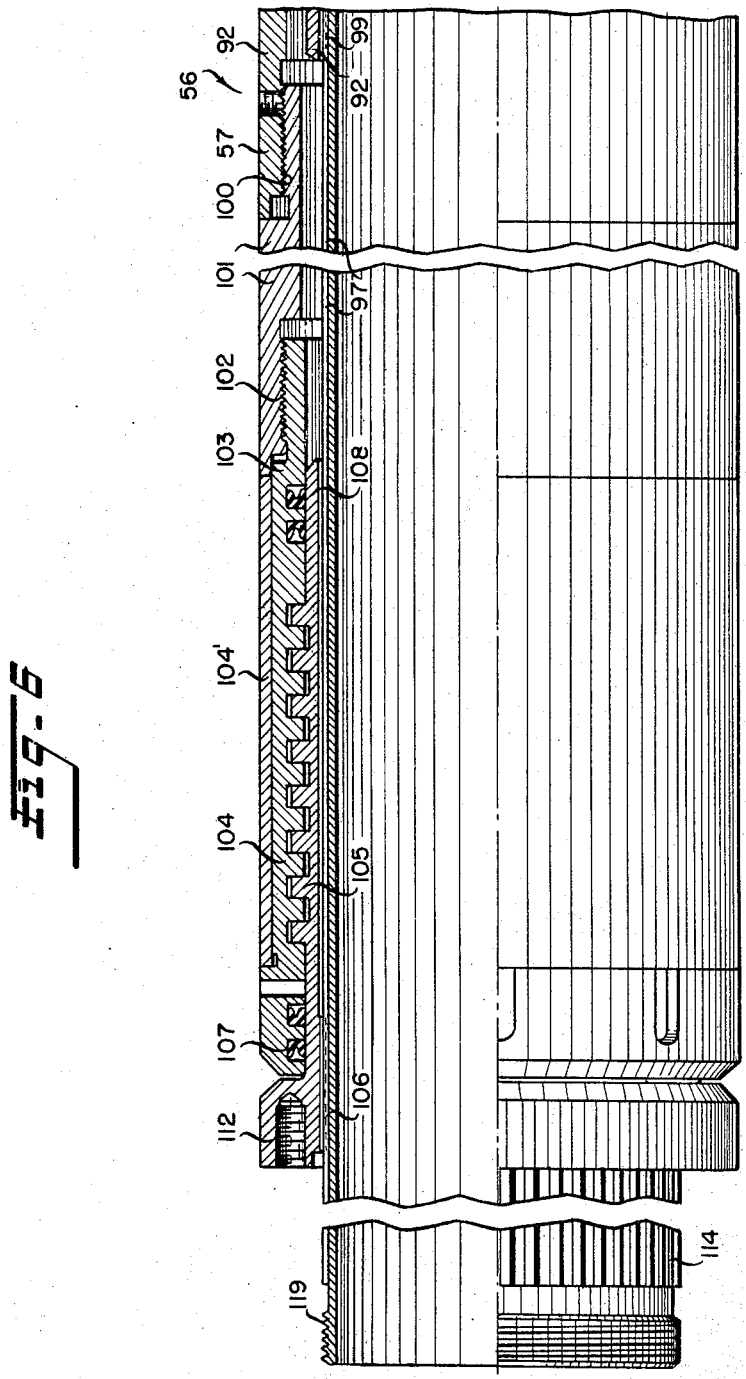
FIGURE 6 is an enlarged fragmentary side elevation partially in section showing the front portion of the pilot assembly; with the anchor and pilot cutter removed and is essentially a continuation of FIGURE 5.

Referring to FIGURES 3 and 5, an annular piston 58 is reciprocably mounted within the bore 59 of a cylinder 61 which is essentially the rear end of a support tube 62 that projects rearwardly rigidly from housing 22. Support tube 62 is shown broken longitudinally in FIGURE 5 and foreshortened to show both the rear end and the main cutter arm hub enlarged for clarity of disclosure.

In practice piston 58 may be rigidly connected as by welding to the rear end of piston rod 56 in FIGURE 5. In any event when piston 58 moves to the left in FIGURE 5 it displaces rod 56 to the left along with it.

Piston 58 has inner and outer peripheral seals 63 and 64. Outer seal 64 is a radially compressed resilient ring in an annular groove facing bore 59. Inner seal 63 is a radially compressed resilient ring in an annular groove facing a stationary cylindrical surface 65 on an annular internal boss 66 projecting forwardly from the rear end member 67 of support tube 62.

The rear end of piston rod 56 is thus carried by or rigid with piston 58. Near its forward end tube 56 (FIGURE 5) is slidably supported in the cylindrical bore 68 of an internal ring 69 that is keyed at 71 to support tube 62. A collar 72 fixed around support tube 62 supports a bearing ring 73 for main cutter arm hub 26, and is engaged by annular seal assemblies 74 and 75 carried by the rotating cutter hub 26. The forward seal 74 is maintained by a ring 76 removably secured to the hub 26 as by studs 77.

A chevron type seal ring 78 carried by an outer ring 79 secured to a mounting ring 81 as by studs 82. The internal piston tube support ring 69 is fixed to mounting ring 81 as by studs 83.

As shown in FIGURE 5, a cylindrical spacer collar 84 is freely slidably mounted upon piston rod 56 within the cylinder 61. Collar 84 is much shorter than cylinder 61, and in operation when oil under pump pressure enters through port 85 to the annular space 86 at the right of piston 58, this displaces piston 58 and rod 56 to the left in FIGURE 5 until spacer collar 84 is in rigid abutment at opposite ends with fixed ring 69 and piston 58. This limits the extension of rod 56 to the left in FIGURES 3 and 5.

In order to displace piston 58 and rod 56 to the right in FIGURE 5, fluid under pressure is introduced into the forward part of cylinder 61 through the port 87 which always remains uncovered due to spacer 84. As shown in FIGURE 3, a conduit 88 is provided to admit hydraulic fluid to port 87. Hydraulic fluid conduits (not shown) connect inlet 85 and the rear end of conduit 88 to a main hydraulic pump 89 (FIGURE 1) connected to hydraulic fluid reservoir 91.

Referring to FIGURES 3 and 5, a hollow drive spindle rear section 92 has fixed on its rear end a collar 90 projecting from the interior of support tube 62 and carrying a gear 93 that is constantly meshed with drive gearing driven by a hydraulic motor 94 disposed in a pilot motor housing 95 secured upon the end of tube 62. Spindle section 92 is journaled on a bushing 96 carried by boss 66.

An intermediate hollow drive spindle section 97, which carries bushings 98 for sliding engagement with the interior of rear section 92, is telescoped within rear section 92 as shown in FIGURE 5 and non-rotatably but longitudinally slidably connected thereto by longitudinal splines 99.

A hollow tube 101 (FIGURE 6) is threaded into the front end of piston rod 56 at 100 and is internally threaded at 102 to receive a collar 103 assembly formed internally with a stepped annular thrust bearing 104 in which is rotatably supported a forward spindle section 105 having an internal splined connection at 106 with the front end of spindle section 97. Bearing 104 comprises two semicylindrical bearing elements held in assembly about spindle section 105 by a surrounding sleeve 104'. Fluid tight oil seals are provided at 107 and 108 at opposite ends of the thrust bearing.

Thus when motor 94 drives gear 93 the spindle sections 92, 97 and 105 are rotated about their axes, piston rod 56 and collar 103 being reciprocable but non-rotatable.

Figure 7:
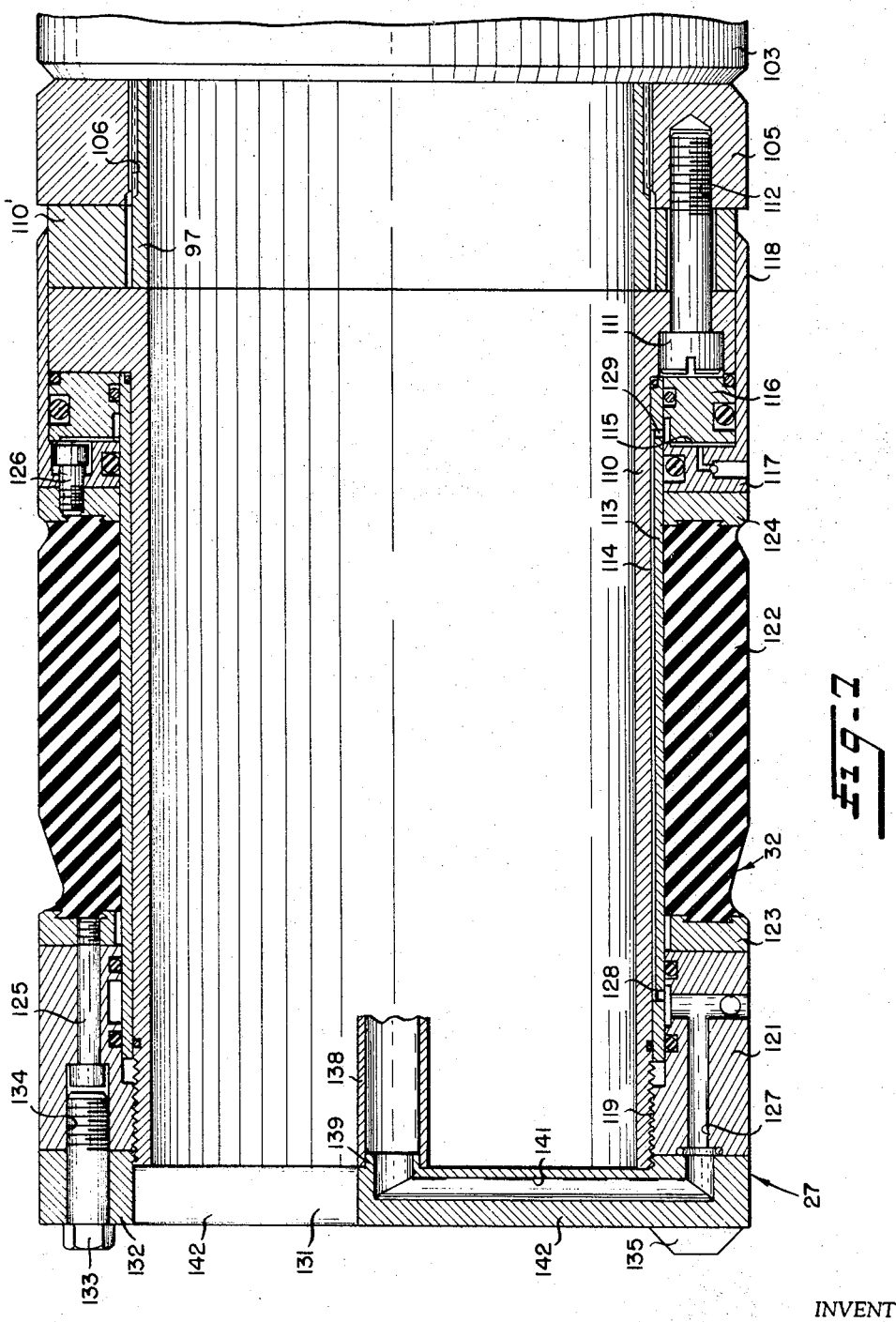
FIGURE 7 is an enlarged fragmentary view mainly in section showing the anchor and pilot cutter structure at the front end of the pilot cutter assembly and is essentially a continuation of FIGURE 6.

FIGURE 7 shows the pilot anchor assembly secured on the front spindle section. A drive tube 110 is secured upon the end of spindle section 105 as by cap screws 111 extending through a spacer ring 110' and entering threaded axially disposed bores 112. An annular sleeve 113 surrounds tube 110 with internal longitudinal grooving 114 providing oil passages leading to an annular cylinder space 115 between a retainer fixed ring 116 and a piston 117 slidable axially on sleeve 113. Piston 117 has a cylindrical guide skirt 118 extending slidably over the adjacent spacer ring periphery.

At its forward end tube 110 is threaded at 119 to mount a nut 121 which extends sealingly over the adjacent end of sleeve 113. A resilient pilot sleeve assembly consisting of a rubber annulus 122 having rigid rings 123 and 124 bonded to opposite ends surrounds sleeve 113, with ring 123 secured to nut 121 as by screws 125, and ring 124 secured to piston 116 as by screws 126.

A hydraulic fluid inlet passage is formed at 127, and oil enters and leaves the longitudinal passages 114 of sleeve 113 through radial ports 128 and 129 respectively, to enter cylinder space 115.

The pilot cutter blade or like assembly 131 which does the actual cutting of the pilot bore comprises an annular mount 132 secured upon the end of nut 121 by bolts 133 entering threaded bores 134, and cutter blades 135 are secured thereon.

In its relaxed non-expanded condition which exists when the pilot bore is being formed, the external diameter of resilient sleeve 122 is not greater than that of the rest of the pilot assembly of FIGURE 7 on piston rod 56, but when oil under pressure is introduced into space 115 to drive piston 117 to the left in FIGURE 7, the sleeve 122 will be radially expanded beyond the diameter of the associated metal parts of the pilot anchor and will tightly grip the walls of the pilot bore.

As shown in FIGURE 3 a hydraulic oil conduit 136 extends from a control valve 137 to a telescopic section 138 within the drive spindle assembly, and at its front end has a rotating seal fitted at 139 (FIGURE 7) with one end of a passage 141 extending through a spider leg 142 of pilot blade mount 132 to passage 127. Thus actuation of control valve 137 by the operator selectively expands the sleeve 122 for anchoring the pilot in its bore. The material cut by the pilot blades passes rearwardly through the interior of the hollow drive spindle assembly to discharge at the rear of the machine.

FIGURE 4 shows details of the two speed planetary transmission 46, which is enclosed in housing 151 bolted end to end with motor housing 21. The hollow motor driven shaft 43 enters housing 151 and has secured upon it the sun gear 152 which is meshed with the large gear section 153 of compound planet gears 154 journaled on stub shafts 155 rigid with a spider 156. Spider 156 is fixed on a hollow hub 157 concentric with shaft 43 mounted in the housing 151 by bearings 158 and joined with splined end sockets 159 and 161 for non-rotatable connection to output drive shafts 47 and 48 respectively.

Planet gear section 153 is meshed with a ring gear 162 which has a rim 163 extending between axially slidable non-rotatable discs of a brake assembly 164. Planet gear section 165, smaller than gear section 153, is meshed with a ring gear 166 having a rim 167 extending between the axially slidable non-rotatable disc of a brake assembly 168. An annular piston 169 at one side of the housing 151 slides axially in a cylinder 170 to abut the brake assembly 164, and an annular piston 171 at the other side of housing 151 is axially slidable in cylinder 172 to abut the brake assembly 168.

A fluid passage 173 leads into cylinder 170, and a fluid passage 174 leads into cylinder 172.

An increase in fluid pressure in cylinder 170 will displace piston 169 to cause the brake assembly 164 to hold ring gear 162 stationary. At this time brake 168 is released, so that if shaft 43 is being driven, power will be transmitted through the sun gear 152 with planet gear section 153 rolling around the internal ring gear 162 and this rotates the carrier 156 at low speed. When piston 171 is shifted to apply brake 168 to arrest ring gear 166, and brake 164 is released, power will be transmitted through the sun gear 152 to roll planet gear section 165 around the ring gear 166 to rotate the carrier 156 at a higher speed.

Thus shafts 47 and 48 may be simultaneously rotated at the same high or low speed. The left end of shaft 48 in FIGURE 4 is connected by a worm and gear to the left cutter arm 24 similarly to that just described for the right cutter arm in FIGURE 1. While both shafts 47 and 48 rotate in the same direction, the worm on the outer end of shaft 48 is pitched to result in the two arms 24 being oppositely rotated as above explained.

Figure 8:
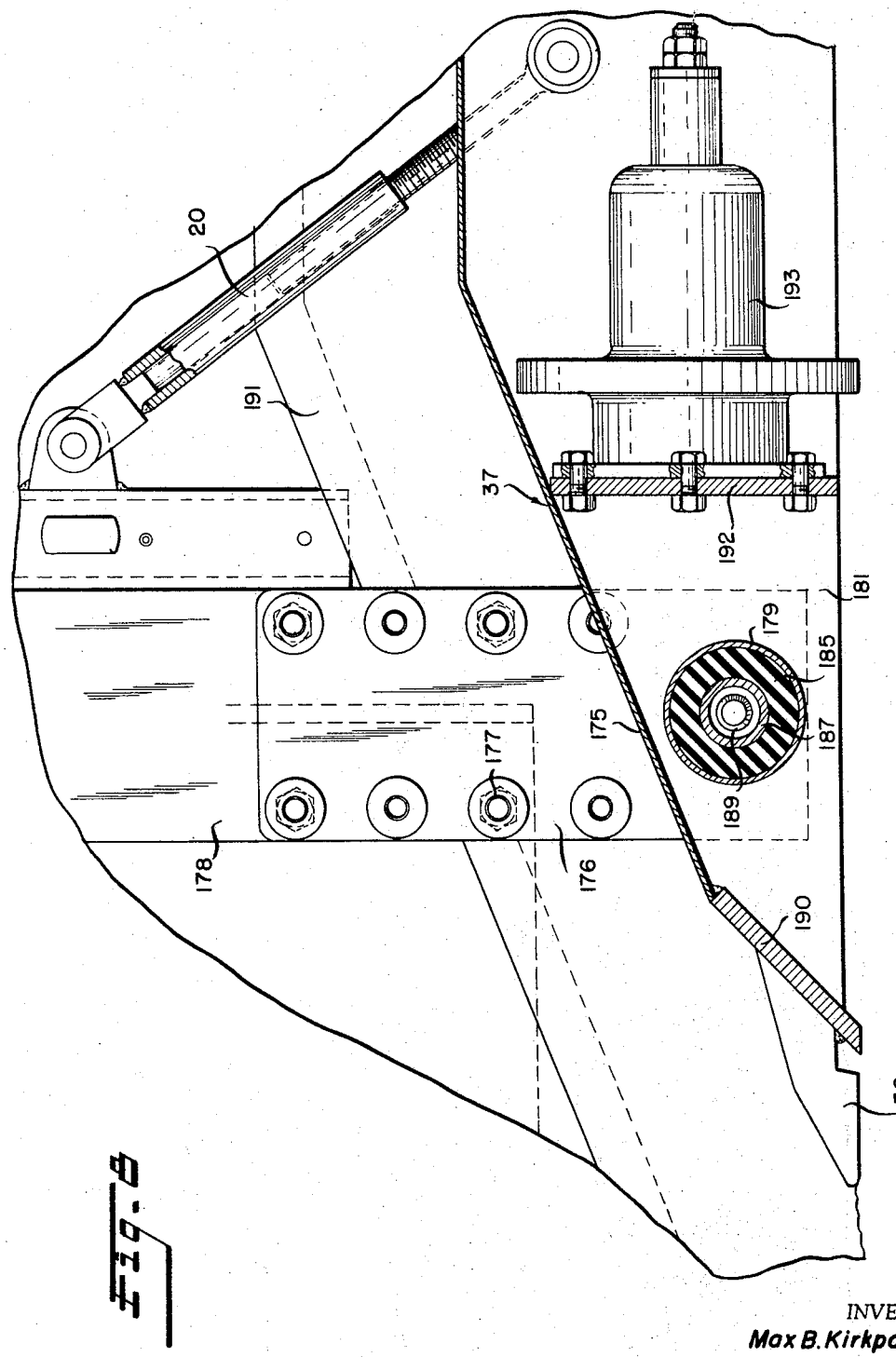
FIGURE 8 is a fragmentary section generally along line 8—8 indicated in FIGURE 1 showing the lower vibratory cutter mounting and structure.
Figure 9:
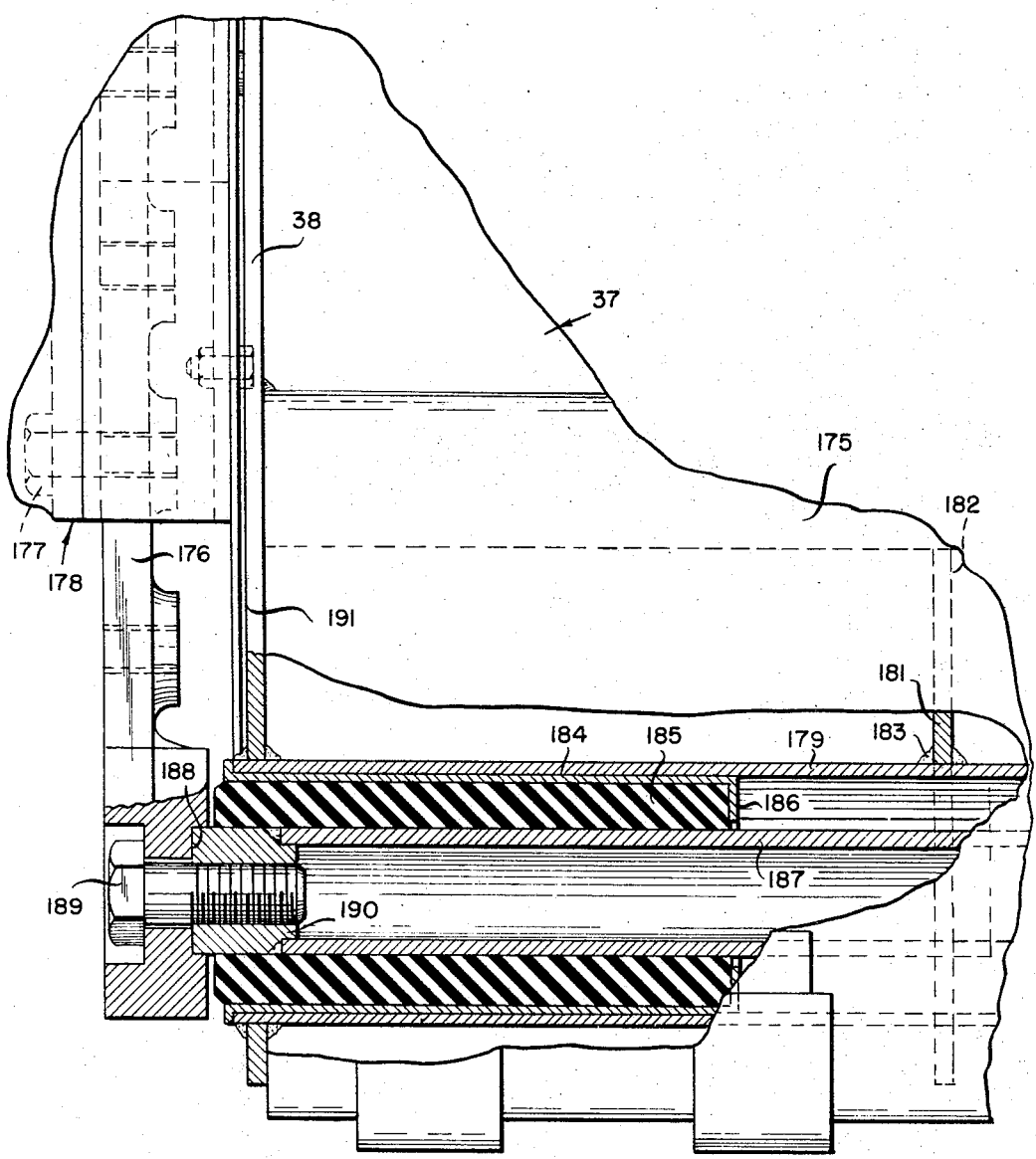
FIGURE 9 is a fragmentary front elevation partly cut away and in section showing the rubber bushing cutter support of FIGURE 8 on the machine frame.

Referring now to FIGURES 8 and 9, the lower cusp cutter assembly 37 is essentially a sheet metal plate 175 that extends from front to rear of the machine across the lower open part of the inverted U-frame.

The opposite sides of plate 175 are resiliently mounted on upstanding side brackets 176 rigidly attached as by bolts 177 to the inner sides of the legs 178 of the U-frame.

Plate 175 (FIGURE 9) is rigidly mounted on a transverse hollow support rod 179, as by a series of depending ribs 181 welded to the bottom of plate 175 at 182 and to rod 179 at 183. At opposite ends rod 179 has an internal resilient bushing consisting of a shell 184 press fitted within rod 179 and confining a rubber or like resilient annulus 185. The inner end of shell 184 is bent over at 186 to restrict axial flow of the rubber, and axial flow at the other end is opposed by brackets 176.

A rigid hollow metal tie rod 187 coaxial with rod 179 extends at opposite ends snugly through the rubber bushings 185, and an internally threaded plug 190 is fixed in each end of rod 186 as by welding. The outer end of each plug 190 is snugly seated in a recess 188 in the associated bracket 176. Bolts 189 extends through brackets 176 into plugs 190 to rigidly secure the brackets to opposite ends of rod 187, and there is thus no shear load on the resilient annuli 185. Side plates 191 are welded in upright relation to opposite ends of rod 179 to form the trough shape at 38.

Thus the toothed cutter 37 is resiliently mounted on rod 187 which is rigid with the machine frame.

Referring to FIGURE 8, a transverse plate 192 rigid with plate 175 is substantially vertically disposed and mounted on it is a periodic impact motor 193 of suitable characteristics. It will be noted that motor 193 is disposed at about the same vertical level as teeth 30 and resilient bushings 185.

Impact motor 193 is preferably of the electrically driven vibrator type which effectively delivers accurately timed impacts at a frequency of about 3600 per minute to plate 192, these impact forces acting substantially horizontally in the direction of cut of teeth 30.

As the machine of the invention is pulled into the material to be cut, reacting against the anchored pilot, the teeth 30 are engaged under considerable pressure with at least the lower uncut cusp of material, and during that time the impactor motor is operated. I have found that by superposition of these periodic impact forces upon and acting in essentially the same direction as the force pressing the cutter teeth 30 into the material, in the invention wherein the cutter 37 is resiliently mounted on the machine frame, provides speedy efficient fracture and displacement of the material before the teeth. Energy of the impact forces is periodically stored and released at the resilient mounts 185 during this action.

*Operation*

In operation of the foregoing described machine the machine of FIGURE 1 is brought up to the face of the coal, rock or other material to be cut by tracks 11, and then anchored in the tunnel by the sprag arms 17, 18.

The pilot cutters 27, rotated from motors 94 through gears 93 and the spindle structure rotating within piston rod 56, are fed forward into cutting engagement with the material by applying hydraulic pressure to piston 58 to slidably forwardly displace piston rods 56 through the main cutter hubs. The telescopic drive spindle structure maintains the drive to the rotating head of FIGURE 7. The main cutter arms 24 are not yet rotated. The material cut by cutters 27 passes rearwardly out through the hollow pilot assembly.

After the piston rod 56 has been extended to cut a pilot bore of desired length, say several feet, rotation of the pilot cutters may be discontinued and hydraulic fluid under pressure introduced by valves 137 through the telescopic conduit system 138, passages 141 and the other pilot cutter head passages to the spaces behind pistons 117 which are thereby axially displaced to radially expand resilient annuli 122 in gripping engagement with the pilot bore wall at the extreme front end of the pilot bore.

The electrical motor in housing 21 may now be energized, and it rotates both sets of main cutter arms, which rotate in overlapped synchronism in opposite directions. The sprags at 17, 18 are released.

Hydraulic fluid under pressure is now introduced into cylinders 61 forwardly of each piston 58, the hydraulic pressure at the rear of cylinders 61 being now relieved. Since each piston 58 is now tightly anchored, through piston rod 56 and expanded sleeve 32, within the formed pilot bore, the hydraulic pressure in cylinders 61 acts effectively against the anchored pilot and displaces the machine forwardly with tremendous force sufficient to enable main cutters 24 to gradually advance and cut the main tunnel. The main cutters 24 are thus pulled forwardly into the material by a force reacting against a point of anchorage deep within the material being cut, and I have found that faster tunnel forming can be accomplished by this structure and mode of operation than prior devices which depended on brute force to try to push main cutters into the material. The invention also enables a lighter weight frame than previously considered possible because the forces which the frame must withstand are less, this being due to efficiently applied force reaction under the invention.

The force which pulls the rotating main cutters into the material also pulls cutters 37 and 35 into the material. All of the cut material accumulates at the front of trough 38 and passes therethrough as the machine advances in this cycle of cutting the main tunnel until the main cutters reach the forward level of the anchored pilot. Then the main cutters are disabled, a new pilot bore is formed, the pilot is anchored, and the main cutters advanced in another cycle. This cyclic advance continues until a tunnel of desired length is formed.

In the foregoing it will be noted that the pilot cutters are disabled when the main cutters are in action. While this is mainly satisfactory, for some applications as in hard rock tunneling it is highly desirable after the first cycle to maintain simultaneous rotation of the pilot and main cutters for substantially continuous advance of the machine.

Figure 10:
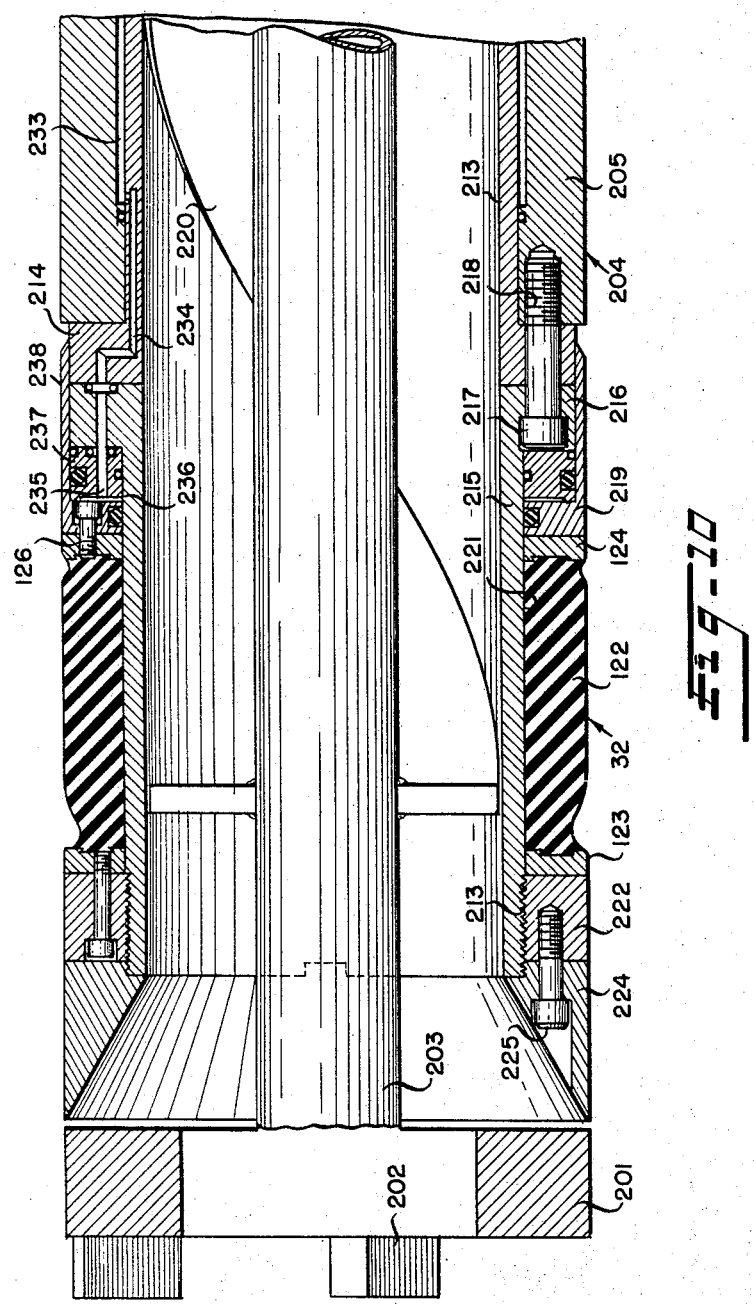
FIGURE 10 is an enlarged fragmentary view in section showing the front end of a pilot structure adapted to be used in the machine of FIGURES 1–9 but wherein the pilot cutter may be rotated simultaneously with the main cutter.
Figure 11:
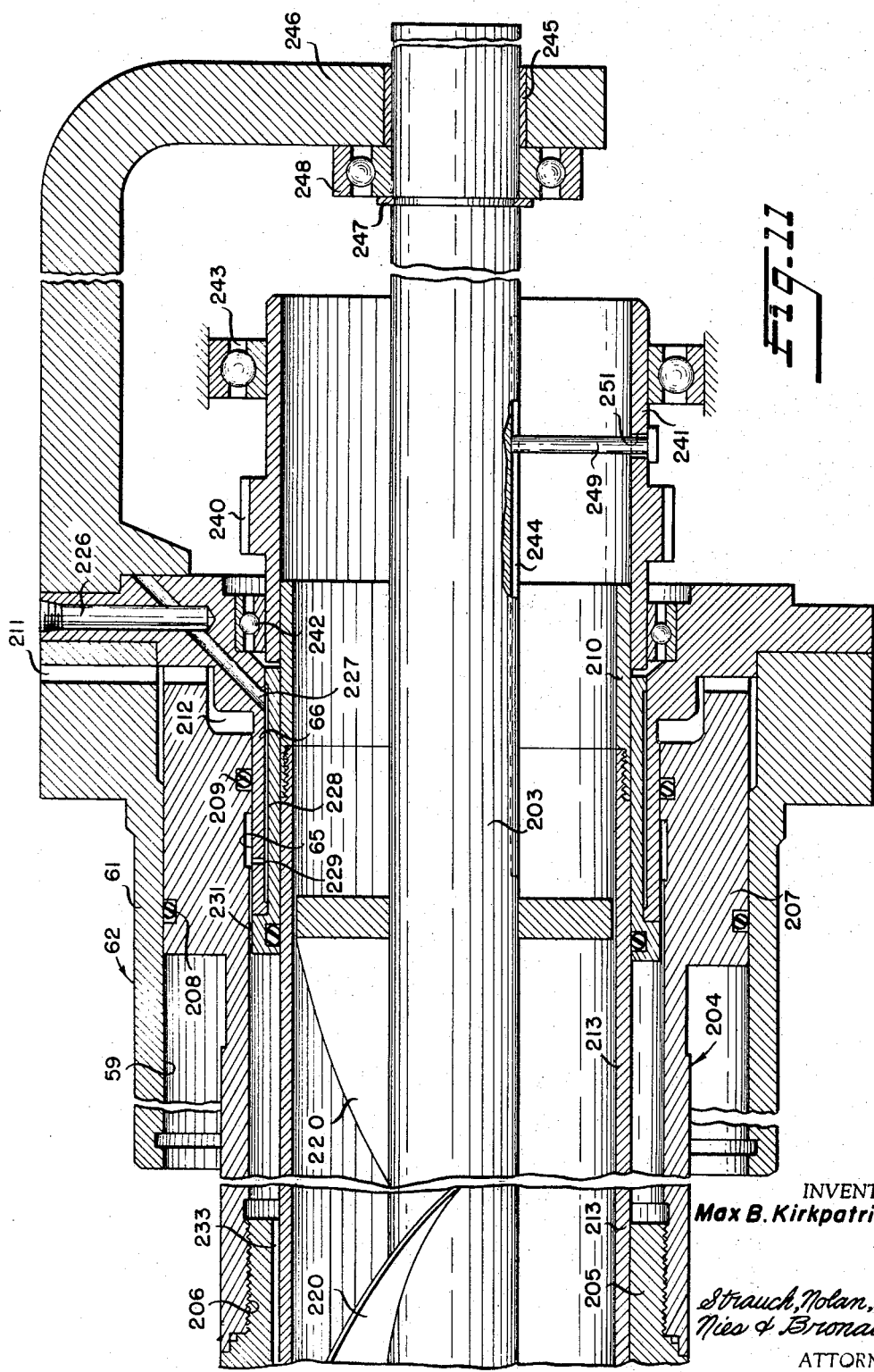
FIGURE 11 is an enlarged fragmentary view in section constituting a rearward extension of FIGURE 10 and showing internal pilot cutter drive structure.

A modification of the machine of FIGURES 1-9 is shown in FIGURES 10 and 11 which will convert it to such simultaneous rotation of the pilot and main cutters.

Referring to FIGURE 10 a pilot cutter 201 having cutting teeth 202 is mounted on a rotatable shaft 203 that extends through the piston rod assembly 204 which in turn is mounted for non-rotatable but longitudinally slidable displacement through the main cutter hub like piston rod 56.

The piston rod assembly 204 comprises a rigid tube 205 having its rear end threaded at 206 for attachment of an annular piston 207. Piston 207 is slidable in cylinder 61 and has outer and inner peripheral seals 208 and 209 cooperating respectively with bore 59 and surface 65. Oil under pressure introduced through opening 211 will enter the annular space 212 to the right of piston 207 in FIGURE 11 and displace the entire piston rod assembly 204 to the left in FIGURES 10 and 11.

Internally the piston rod assembly has a central hollow tube 213 which (FIGURE 10) has a flanged outer end 214, and coaxial with tube 213 is a pilot head tube 215 flanged at 216 to mount bolts 217 that extend through tube flange 214 and enter threaded bores 218 in tube 205. Thus tubes 213 and 215 which have the same internal cylindrical diameter are rigidly united. Shaft 203 has a continuous helical rib 220 extending longitudinally thereof with its outer surface in rotating engagement with the inner periphery of tubes 205 and 215.

An annular pilot piston 219 is slidably mounted on the outer surface 221 of tube 215, and the resilient anchor sleeve 32 is also mounted on tube 215 axially between piston 219 and a collar 222 fixed as by threads 223 on the outer end of tube 215. An annular flared cap 224 is secured on the end of tube 215 as by bolts 225.

Hydraulic fluid for expanding the pilot anchor annulus 122 is introduced at opening 226 through passage 227, annular space 228, radial ports 229, annular space 231, annular space 232, and longitudinal passages 233, 234 and 235 to enter annular space 236 to the right of piston 219 in FIGURE 11. Passage 235 extends through a retainer and seal assembly 237 enclosed by the piston skirt 238 which also extends rearwardly over flanges 216 and 214.

Thus the expansible anchor sleeve 122, which may be radially expanded into tight grip with the pilot bore formed by rotation of pilot cutter 201, is in this form of the invention carried by the non-rotatable part of the piston rod, as distinguished from being mounted on the rotatable head in FIGURES 1-9.

Referring to FIGURE 11, the drive gear 240, which is meshed with the gear train from motor 94, as shown in FIGURE 2, has its hub 241 rotatably supported in bearings 242 and 243, and the shaft 203 radially inwardly of gear 240 is formed with a longitudinal surface keyway or slot 244.

At its rear end shaft 203 is rotatably slidably mounted in a bushing 245 on a bracket 246 rigid with the machine frame, and a snap ring 247 on the shaft coats with a thrust bearing 248 on the bracket to prevent rearward displacement of shaft 203. When it is desired to rotate shaft 203 for drilling the pilot bore, a solid drive key or pin 249 is inserted through an opening 251 in the gear hub to enter slot 244 to solidly connect gear 240 to shaft 203. This key may be removed when the pilot cutter 201 is not to be actuated.

In the FIGURES 10 and 11 embodiment the piston tubes 205 extend slidably through the hubs of the main cutters 24 just as in the FIGURES 1-9 embodiment, and the main cutters 24 are driven, independently of pilot actuation, from the mian electric motor in housing 21. The pilot cutters may be idle, as when key 249 is removed from engagement with grooves 244, or may be driven while the main cutters are idle, or may be driven simultaneously with the main cutters.

In actual operation the machine is brought up to the face of the material to be cut until pilot cutters 201 are in contact. At this time the piston rod assembly 204 is in its most rearward position, and no cutters are rotating. The machine frame is anchored, key 249 is inserted to connect gear 240 to shaft 203, and the motors 94 are started to rotate the pilot cutters. Oil under pressure is introduced into cylinder space 212 and this slidably displaces piston rod assembly 204 to the left in FIGURES 10 and 11. Cap 224 abuts pilot cutter 201 and displaces the cutter and shaft 203 to the left in FIGURES 10 and 11, feeding the rotating pilot cutter at a desired rate into the material to be tunnelled. Key 249 slides in groove 244 to maintain the drive to shaft 203. This effects the initial pilot bore cut to the desired deph.

Now each extended piston tube is anchored by expansion of sleeve 122, this being accomplished by introduction of oil under pressure into space 236, the operator starts the main cutters in operation, and oil under pressure is introduced forwardly of piston 207, by the same arrangement as shown in FIGURE 3, and the machine pulls itself forwardly into the material toward the anchored forward end of the pilot with the main cutters operating.

The action is now the same as for FIGURES 1-9, except that for this embodiment I may maintain rotation of the pilot cutters while the main cutters are forming the main tunnel. The advantage of this is that by the time the machine has been pulled forwardly a distance corresponding to the originally formed pilot bore depth a new aligned section of pilot bore will have been cut ahead of the machine.

As the pilot cutters 201 continue to cut they advance away from the anchored piston rod assembly 204, and they are designed to cut a new pilot bore section of the same length as the original by the time the machine has been pulled forwardly the length of the original pilot bore. At this time the pilot anchor sleeve 122 is deflated, oil under pressure is differentially applied to quickly shift the piston rod assembly forward until it abuts the advanced pilot cutter 201, and the pilot anchor sleeve 122 is reexpanded to anchor the piston rod assembly, and the oil under pressure is applied to the cylinder 61 forwardly of the piston 207 to resume main cutter feeding toward the material.

This operation of shifting the pilot forward and reanchoring can take place so quickly that advance of the main cutters into the face of the material is not appreciably interrupted, and so substantially continuous cutting of the main tunnel is effected.

What is claimed and desired to be secured by Letters Patent is:

1. A shaft boring machine comprising:
    a frame;
    at least a pair of main cutters mounted on said frame for boring into the face of the material to be bored;
    means for advancing said main cutters into said material;
    cutter means mounted between said main cutters having an elongated cutting edge for cutting a kerf substantially parallel to the axis of said shaft in the face of the material to be bored and extending rearwardly between said main cutters to form a chute for cut material;
    a vibrator for subjecting said cutter means to periodic impact forces having a direction substantially the same as the direction of advancement of the machine; and
    resilient mounting means positioned between said vibrator and said cutting edge for mounting said cutter means on said frame and for periodically storing and releasing said impact forces;
    said resilient mounting means including a hollow support rod secured to said cutter means and a tie rod secured to said frame and at least a pair of resilient bushings positioned between said tie rod and said hollow support rod.

2. The apparatus of claim 1 further including a pilot cutter assembly extending ahead of said main cutter for boring a pilot hole and means for anchoring a portion of said pilot cutter assembly in said pilot hole.

References Cited

UNITED STATES PATENTS

| | | | |
|---|---|---|---|
| Re. 24,965 | 4/1961 | Kirkpatrick | 299—31 |
| 2,214,551 | 9/1940 | Edwards | 175—230 X |
| 2,823,024 | 2/1958 | Hagenbrook | 299—69 X |
| 2,831,668 | 4/1958 | Skowronski | 299—69 |
| 2,991,058 | 7/1961 | Alspaugh et al. | 299—57 |
| 3,128,998 | 4/1964 | Sibley | 299—37 |
| 3,151,912 | 10/1964 | Herrman | 299—34 |

FOREIGN PATENTS 878,807  10/1961  Great Britain.

ERNEST R. PURSER, *Primary Examiner.*